May 8, 1956 S. OFFERMAN 2,745,080

SOCKET FOR RADIO TUBES AND THE LIKE

Filed Nov. 19, 1951 3 Sheets-Sheet 1

INVENTOR.
SEYMOUR OFFERMAN
BY James and Franklin
ATTORNEYS

May 8, 1956 S. OFFERMAN 2,745,080

SOCKET FOR RADIO TUBES AND THE LIKE

Filed Nov. 19, 1951 3 Sheets-Sheet 2

INVENTOR.
SEYMOUR OFFERMAN
BY James and Franklin
ATTORNEYS

May 8, 1956 S. OFFERMAN 2,745,080

SOCKET FOR RADIO TUBES AND THE LIKE

Filed Nov. 19, 1951 3 Sheets-Sheet 3

INVENTOR.
SEYMOUR OFFERMAN
BY James and Franklin
ATTORNEYS 2,745,080
Patented May 8, 1956

2,745,080

SOCKET FOR RADIO TUBES AND THE LIKE

Seymour Offerman, Great Neck, N. Y., assignor to Industrial Hardware Mfg. Co., Inc., New York, N. Y., a corporation of New York Application November 19, 1951, Serial No. 257,015

6 Claims. (Cl. 339—194)

This invention relates to sockets to receive multiple pin connectors, typically the base of radio, television, or like tubes.

The primary object of the present invention is to generally improve tube sockets. The conventional socket comprises an insulation base with a ring of metal contacts, each contact including a pin gripping portion and a soldering lug to which circuit wires are first connected by bending and later by soldering. The attachment by bending and the soldering are painstaking and time-consuming tasks, even when put on an assembly line basis, and they represent a substantial factor in the cost of a radio or television receiver.

It has accordingly been proposed to provide each contact of a socket with a suitable clip or wire gripping portion, in lieu of the soldering lug conventionally employed. Thus the end of the wire to be connected may be simply pushed into the wire gripping portion, with considerable saving of time and effort. Moreover, by directing the wire gripping portions upward above the flat top face of the chassis, and by keeping the top of the chassis clear except for the wire gripping portions, it becomes possible to quickly and simultaneously solder all of the connections to all of the sockets of the chassis by arranging a dipping conveyor or other equipment to dip all of the wire grip portions (after the wire ends have been inserted therein) into a vat of flux, followed by a vat of molten solder.

I have discovered that considerable difficulty arises in attempting to practice this labor-saving process. Defective connections or open circuits have occurred, and I have found that the difficulty arises from the fact that in typical circuit arrangements it may be necessary to connect anywhere from one to four conductors to a single contact of the socket. Moreover, these conductors may vary in diameter over a considerable range of say 2:1, or typically from a diameter of 0.02" to 0.04". This may result in certain unique combinations of wires, in which one of the wires is not successfully gripped by the wire gripping portion of the contact, with the consequent possibility of escape prior to the soldering step.

The primary object of the present invention is to overcome the foregoing difficulty, and to provide a generally improved type socket which facilitates connection, and which insures an excellent grip on the wires over a range of from one to four wires and over a substantial range of wire diameter.

In the socket so far as described, the pin gripping portion of the contact may be conventional, but I have found that in sockets for miniature tubes having many pins, say seven, the spacing between the pin gripping portions of the contacts may become so small as to introduce the problem of possible electrical leakage therebetween. I have found that this problem is aggravated in the case of contacts in which the pin gripping portion is of the barrel type, by certain tabs or ears of metal which have been provided to support the free sides of the barrel against movement when subjected to the force of the tube pin. These tabs project sidewardly at the smallest diameter portion of the ring of contacts, and thus come closer to one another than the barrels of pin gripping portions themselves. A further object of the present invention is to overcome this difficulty, which is done by the provision of tabs made and located in a novel way which minimizes the possibility of electrical leakage between adjacent contacts.

To accomplish the foregoing general objects, and other more specific objects which will hereinafter appear, my invention resides in the tube socket elements, and in the metal contacts therefor, as are more particularly described in the following specification. The specificatoin is accompanied by drawings in which the contacts and the sockets are for the most part shown in inverted position, because that is the wiring and soldering position. In practice the chassis, sockets and tubes may be used in any desired position, but for convenience and uniformity in language the verbal specification assumes that the normal position of the socket is one in which the tube is received vertically from above. The terms "upper lamination" and "lower lamination" are used in that sense.

With this understanding the drawings may be briefly described as follows.

Figure 4:
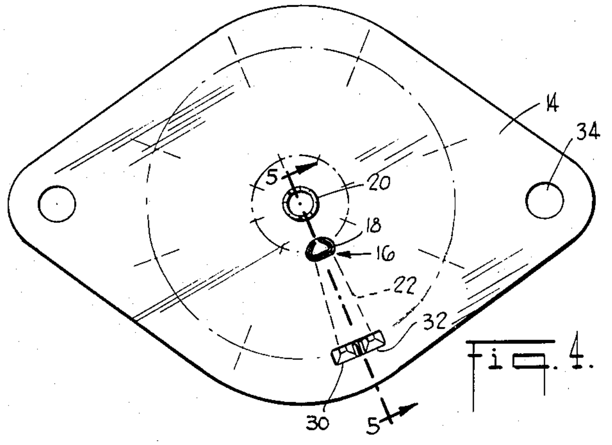
Fig. 4 is a plan view of a laminated tube socket in inverted position.
Figure 5:
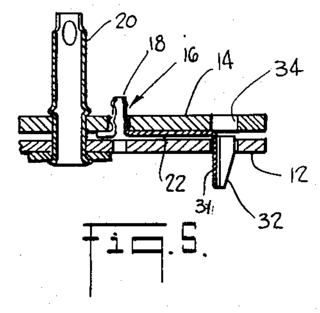
Fig. 5 is a section taken in the plane of the line 5—5 of Fig. 4.

Referring to the drawings, and more particularly to Figs. 4 and 5, I there show a laminated tube socket comprising an upper lamination of insulation material 12, and a lower lamination 14, between which metal contacts 16 are secured. These contacts are arranged in a ring, the pin gripping portions 18 thereof being disposed on a circle at the proper radius and spacing to receive the pins of the radio tube for which the socket is designed. In Fig. 4 only one contact is shown, but it will be understood that there are an appropriate number of contacts—in the present case seven contacts—disposed 45° apart, except for two disposed 90° apart in order to fix the orientation of the tube relative to the socket. If, as in the present case, the socket is provided with a center shield 20, the said shield may be employed as an eyelet to secure the two laminations 12 and 14 together.

Each contact comprises a flat metal base portion 22 which is located between the laminations 12 and 14. These base portions are preferably disposed radially, and the pin gripping portions 18 are preferably located at the inner ends of the base portions 22. The circuit wires are connected to the outer ends.

Figures 8, 9, 10, 11, 12, 13, 14, 15:
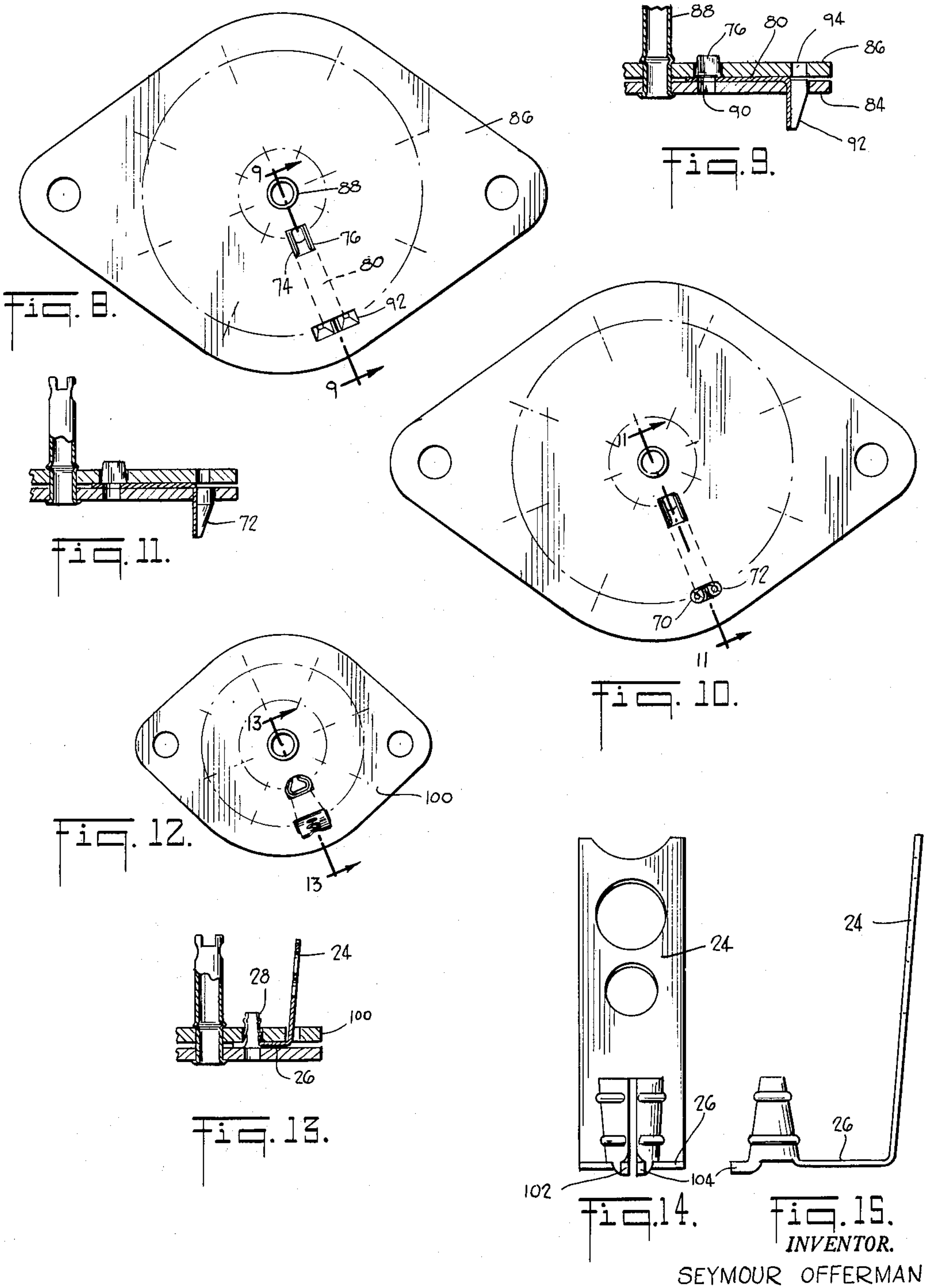
Fig. 8 is a plan view of an inverted socket utilizing the contacts of Fig. 6.
Fig. 9 is a section taken in the plane of the line 9—9 of Fig. 8.
Fig. 10 is a plan view of an inverted laminated socket utilizing the contacts shown in Fig. 7.
Fig. 11 is a section taken in the plane of the line 11—11 of Fig. 10.
Fig. 12 is a bottom view of a modified miniature socket embodying one feature of the present invention, but having an ordinary soldering lug.
Fig. 13 is a section taken in the plane of the line 13—13 of Fig. 12.
Fig. 14 is an end elevation of the contact shown in Figs. 12 and 13, drawn to enlarged scale.
Fig. 15 is a side elevation of the same.
Figure 16:
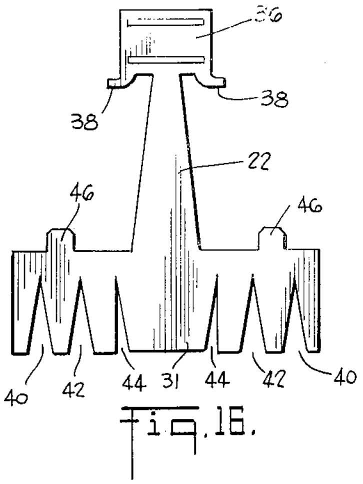
Fig. 16 is a development drawing showing the blank used to make the contact shown in Figs. 1–5.

Referring to Fig. 13, the conventional arrangement heretofore employed a soldering lug 24 bent away from the base portion 26. The lug was bent in the same direction as the pin gripping portion 28, that is, downward with the socket in normal position. The ends of the circuit wires were passed through apertures in the soldering lug and were appropriately bent to secure the same in position, following which the connections were soldered. Each lug was soldered individually.

Reverting now to Figs. 4 and 5, the soldering lug is here replaced by a collateral pair of wire grip portions 30 and 32. These preferably point in opposite direction from the pin gripping portion 18. More specifically, they project upward through upper lamination 12 when the socket is in normal position. It will be understood that during the wiring operation the chassis is inverted, with the socket in the position shown in the drawing. The circuitry is then exposed on top, and the operator merely pushes the bared end of each wire downward through a registering opening 34 in lamination 14, into the wire gripping part 30 or 32. The wire gripping portions are located on a circle concentric with the pin gripping portions, but of substantially larger diameter. The diameter should be greater than that of the lower end or base of the tube, to permit insertion of the tube as far as the socket.

The construction of the metal contact 16 is shown in greater detail in Figs. 1, 2, 3 and 16. Referring to the latter, the contact is made from a metal blank which is generally T-shaped, as there shown. Much of the stem of the T acts later as the base 22 of the contact which is located between the insulation laminations. The free end 36 of the stem is suitably shaped so that it may be folded to form the desired somewhat cylindrical or barrel-shaped pin-gripping portion of the contact. This includes a novel form of support tabs or ears 38 which are described later. The crossbar portion of the T-shaped blank is substantial in height, and each branch thereof is incised with a plurality of incisions. In this case each branch has three triangular incisions 40, 42 and 44. There also are tabs or ears 46 for support, as later described. Each branch is folded toward the other to form a collateral pair of wire grip portions, and because of the incisions these wire grip portions may be made to taper from a large opening at one end to a small opening at the other, and are resilient at the small end.

Figures 1, 2:
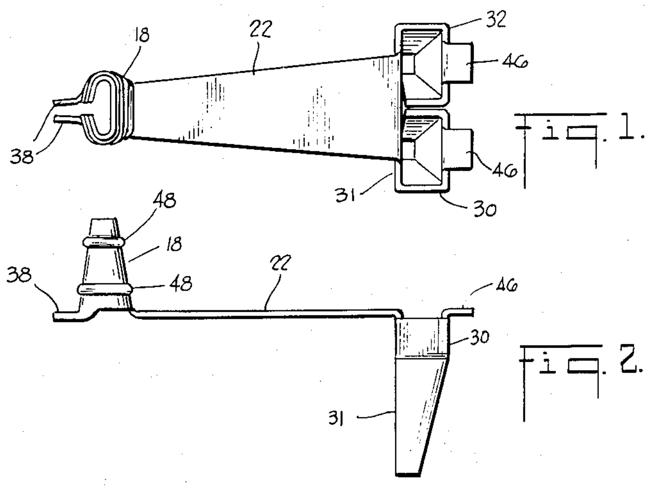
Fig. 1 is a plan view of a metal contact in inverted position.
Fig. 2 is a side elevation of the same.
Figure 3:
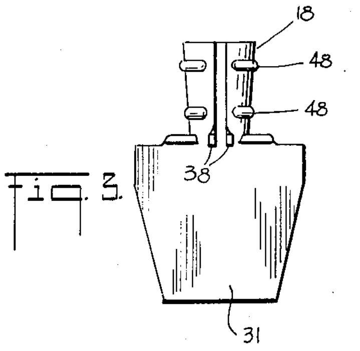
Fig. 3 is an end view of the same.

Figs. 1, 2 and 3 show the contact made from the blank just described. The base portion 22 is flat, and the support tabs 38 and 46 are bent to lie in the plane of the base portion 22, so that in the socket assembly the tabs are supported between the laminations. The wire gripping portions 30 and 32 have large rectangular openings to receive the wire, but taper to small openings at the other end. The two portions are joined by a connecting wall 31. Because of the corner incisions, the sides are free to expand resiliently to grip one or more wires inserted therein.

The pin gripping portion 18 is open at one side so that it too can expand resiliently when a tube pin is inserted therein. The particular part 18 here shown includes annular stiffening ribs 48. The formation and disposition of the support tabs 46 are novel, for these tabs are disposed in vertical planes immediately adjacent one another and opposite the base portion 22, thereby minimizing the possibility of electrical leakage sidewardly between adjacent contacts.

Figure 19:
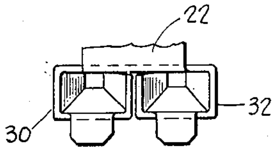
Figs. 19–24 are explanatory of the operation of the wire gripping portions of the disclosed contacts.
Figure 20:
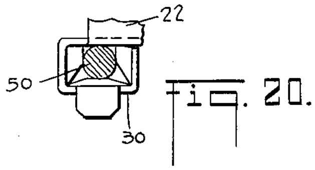
Figure 21:
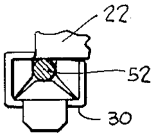
Figure 22:
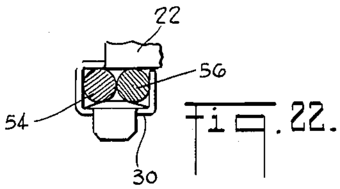
Figure 23:
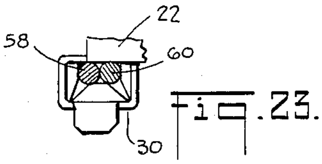
Figure 24:
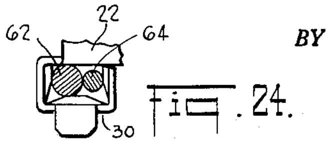

The operation of the wire gripping portions may be described with reference to Figs. 19–24 of the drawing. Fig. 19 shows the wire gripping portions 30 and 32 prior to insertion of a wire therein. Fig. 20 shows how the side walls are spread apart, or how the incisions open up between the side walls, when a single wire 50 of maximum diameter is inserted. Fig. 21 shows how there is some expansion and consequent spring grip on a single wire 52, even if of minimum diameter. Fig. 22 shows how two wires 54 and 56 of maximum diameter may be received and gripped within one of the wire grip portions of the contact. Fig. 23 shows how two wires 58 and 60 of minimum diameter may be received and gripped in one of the wire grip portions of the contact. Fig. 24 shows how two wires, a wire 62 of maximum diameter, and a wire 64 of minimum diameter, may be received and gripped in one of the wire gripping portions of the contact. If it be kept in mind that the contact has two wire gripping portions, as shown at 30 and 32 in Fig. 19, it will be realized that with the present arrangement secure spring gripping connection may be made to each contact by anywhere from one to four wires, ranging over a large range of wire diameter.

Figures 6, 7:
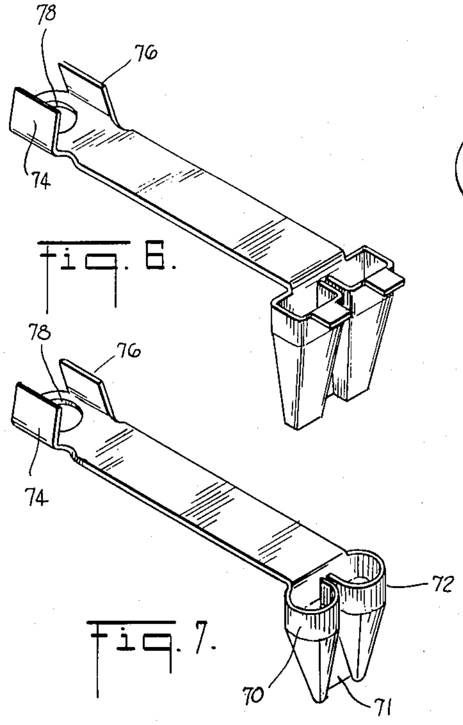
Fig. 6 is a perspective view of a modified metal contact in inverted position.
Fig. 7 is a similar view of a modification.

As so far described, the wire gripping portions have been shown pyramidal in shape, that is, they are rectangular in cross-section and composed of four sides with incisions at the corners. However, it should be understood that they may be made conical rather than pyramidal in shape, and such a variation of the contact is shown at the righthand end of Fig. 7 of the drawing, which is to be contrasted with the righthand end of Fig. 6. More specifically, the wire gripping portions 70 and 72 of Fig. 7 are approximately circular in cross-section, and the tapered ends are conical rather than pyramidal. The portions are joined by a connecting wall 71. Here again, however, the tapered wall has a plurality of incisions to permit outward flexing or expansion of the small ends, and to provide the desired spring grip on the inserted wires. I prefer to employ the pyramidal rather than conical form of the invention, but am influenced in this by the fact that the pyramidal form is somewhat easier to design, develop and form in a high speed progressive die.

It will be recalled that the radio tube pin gripping portion 18 of the contact shown in Figs. 1–5 was of the barrel type. However, it may also be of the edge grip type, and such contacts are shown in Figs. 6 and 7 of the drawing, in which it will be seen that the pin gripping portion consists of sides 74 and 76 which are bent toward one another and disposed in alignment with a pin receiving hole 78. The tube pin is inserted in the direction from the hole past the edges of the parts 74 and 76, and the latter tend to bite into the sides of the pin and to effectively contact and hold the same. Such a pin gripping portion is simple to form, the blank for the contact of Fig. 6 being shown in Fig. 17. The blank is generally T-shaped, with a base portion 80 and a wide cross-bar 82, the latter having a plurality of triangular incisions the same as in Fig. 16. The free end of the stem portion 80 has parts 74 and 76 on each side of a pin-receiving aperture 78, and when these parts 74 and 76 are folded toward one another they form the pin gripping portion of the contact.

Figure 17:
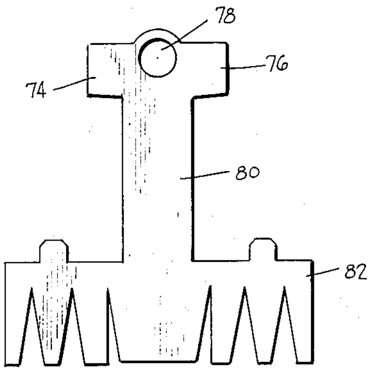
Fig. 17 is a development drawing showing the blank used to make the contact shown in Figs. 6, 8 and 9.

A socket embodying the contact of Figs. 6 and 17 is shown in Figs. 8 and 9 of the drawing. Here again the socket is inverted, and comprises upper and lower laminations 84 and 86 held together by a center shield and eyelet 88. The contacts are disposed radially in a ring with the base portions 80 held between the laminations 84 and 86. The pin gripping parts 74 and 76 are located on a circle of small diameter, and in registration with pin receiving holes 90 in the upper lamination 84. The wire gripping portions 92 are pointed in opposite direction and pass through the upper lamination 84 and are in registration with mating openings 94 in the lower lamination 86. The wire gripping portions are located on a circle concentric with the circle of pin gripping portions, but the outer circle is substantially greater in diameter, it being understood that the latter diameter must be greater than the diameter of the lower end of the tube, for when the tube is inserted in the socket the base of the tube comes all the way to the socket, and within the circle of wire gripping portions. Here again it will be understood that the socket is shown in the inverted position which it assumes during the wiring operations, for the wires are inserted from above and are soldered from below.

Figs. 10 and 11 are generally similar to Figs. 8 and 9, but show a slight variation in which the wire gripping portions 70 and 72 are conical rather than pyramidal in shape. In other words, the socket of Figs. 10 and 11 is similar to the socket of Figs. 8 and 9, except that it employs the metal contact of Fig. 7 instead of the metal contact of Fig. 6. Here again the contacts are preferably disposed radially, with the gripping portions on concentric circles. The diameter of both circles is determined by the tube design, for the inner circle must correspond to the ring of pins projecting from the base of the tube, and the outer circle must come outside the base of the tube.

Figure 18:
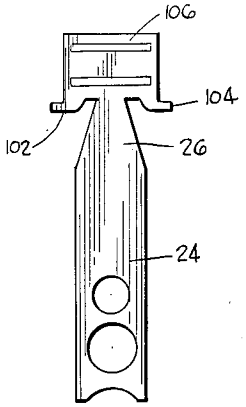
Fig. 18 is a development drawing showing the blank used in making the contact shown in Figs. 12–15.

In connection with Figs. 1–3 it was pointed out that the support tabs 38 are of novel character and have the advantage of not reducing the spacing between adjacent contacts, or of not increasing the danger of electrical leakage. This feature is shown in Figs. 12–15 combined with a soldering lug. The soldering lug 24 is simply an extension of the base portion 26, and is bent to pass through the lower lamination 100. In Fig. 14 it will be seen that the tabs 102 and 104 lie in adjacent vertical planes and are disposed diametrically opposite the base 26. The development of this contact is shown in Fig. 18, and it will there be seen that the support tabs 102 and 104 are stamped to shape in the plane of the sheet material. When the area 106 is folded to form the barrel portion 28, and the latter is bent so that its axis is in perpendicular relation to the base portion 26, the support tabs 102 and 104 come into the desired position.

It is believed that the construction, method of manufacture, and method of use of my improved tube socket, as well as the advantage thereof, will be apparent from the foregoing detailed description.

The chassis is provided with holes at the intended location of the sockets. These holes are made large enough in diameter to clear the wire gripping portions, with no electrical leakage. The sockets are riveted to the chassis.

When the chassis has been partially wired, except for the connections to the sockets, the chassis passes in inverted position before one or more operators who simply push the bared ends of the wires into the appropriate wire gripping portions of the contacts. The lower side of the inverted chassis is clear, except for the wire gripping portions and the wire ends. The chassis is dipped successively into flux and into molten solder while holding the chassis horizontal, the immersion being small enough to wet only the ends of the wires and the wire gripping portions without reaching the chassis itself. Thus in one brief instant, and preferably by means of a mechanical conveyor, all of the many connections to all of the sockets are simultaneously soldered. Wire ends of excessive length, if any, may be trimmed after the soldering operation.

It will also be apparent that while I have shown and described my invention in several preferred forms, changes may be made in the structures disclosed, without departing from the scope of the invention as sought to be defined in the following claims.

I claim:

1. A metal contact for a socket for miniature radio tubes, said contact having a flat base portion adapted to be received between the insulation laminations of a laminated radio tube socket, means at one end of said base to facilitate soldered connection, and a tube pin gripping portion at the other end of said base, said pin gripping portion being of the barrel type and having a pair of tabs at the upper end to help support the barrel portion against the force of a tube pin being inserted therein, said tabs being disposed in substantially parallel vertical planes and immediately adjacent one another opposite the base portion in order to minimize possibility of electrical leakage between adjacent contacts in a miniature radio tube socket, said barrel type pin gripping portion comprising a side wall with adjacent edges, and said tabs being formed as upward extensions of said side wall at the upper ends of the said edges.

2. A laminated socket for miniature radio tubes, said socket comprising insulation laminations with a ring of metal contacts each having a flat base portion secured between said laminations, means at the outer end of each base portion to facilitate soldering a connection thereto, and a pin gripping portion at the inner end of each base portion, said pin gripping portion being of the barrel type and having a pair of tabs disposed in substantially parallel vertical planes immediately adjacent one another opposite the base portion in order to minimize possibility of electrical leakage between adjacent contacts, said barrel type pin gripping portion comprising a side wall with adjacent edges, and said tabs being formed as upward extensions of said side wall at the upper ends of said edges, said tabs being disposed between the laminations for support thereby.

3. A laminated socket for radio tubes or the like, said socket comprising upper and lower laminations secured together with a ring of metal contacts therebetween, each of said contacts having a flat base portion received between the laminations, a plurality of collateral wire grip portions at the outer end of each base portion passing through a lamination, a pin grip portion at the inner end of each base passing through a lamination, said pin grip portion being of the barrel type and having a pair of tabs disposed in substantially parallel vertical planes immediately adjacent one another opposite the base portion in order to minimize possibility of electrical leakage between adjacent contacts, said barrel type pin gripping portion comprising a side wall with adjacent edges, and said tabs being formed as upward extensions of said side wall at the upper ends of said edges, said tabs being disposed between the laminations for support thereby.

4. A metal contact for a tube socket or the like, said contact being formed out of a single integral generally T-shaped blank of sheet metal, the crossbar portion of said T-shaped blank being substantial in height and each branch thereof being incised with three triangular incisions, much of the stem portion of said blank acting as a base adapted to be received between the insulation laminations of a laminated socket, a pin grip portion at one end of said base portion extending in a direction approximately perpendicular to the base portion, said pin grip portion being formed out of the material at the free end of the stem portion, a collateral pair of resilient tapered wire grip portions at the other end of the stem portion extending in a direction approximately perpendicular to the base portion and opposite to the pin grip portion, said wire grip portions being formed out of the incised crossbar portion of the blank, each of said wire grip portions being dimensioned to receive and grip either one or two wires over a substantial range of wire-diameter.

5. A laminated socket for radio tubes or the like, said socket comprising upper and lower insulation laminations secured together with a ring of metal contacts therebetween, each of said contacts being formed out of a single integral generally T-shaped blank of sheet metal, the crossbar portion of said T-shaped blank being substantial in height and each branch being incised with three triangular incisions, much of the stem portion of said blank acting as a base received between the laminations and disposed in radial direction, a pin grip portion at the inner end of each base portion pointing downwardly and passing through the lower lamination, said pin grip portion being formed out of the material at the free end of the stem portion, a collateral pair of resilient tapered wire grip portions pointing upwardly at the outer end of each base portion and passing through the upper lamination, said portions being formed out of the crossbar portion of the blank, each of said wire grip portions being dimensioned to receive and grip either one or two wires over a substantial range of wire-diameter.

6. A laminated socket for radio tubes or the like, said socket comprising upper and lower insulation laminations secured together with a ring of metal contacts therebetween, each of said contacts being formed out of a single integral generally T-shaped blank of sheet metal, the crossbar portion of said T-shaped blank being substantial in height and each branch being incised, much of the stem portion of said blank acting as a base received between the laminations and disposed in radial direction, a pin grip portion at the inner end of each base portion pointing downwardly and passing through the lower lamination, said pin grip portion being formed out of the material at the free end of the stem portion, a collateral pair of resilient wire grip portions pointing upwardly at the outer end of each base portion and passing through the upper lamination, said portions being formed out of the crossbar portion of the blank, each of said wire grip portions being dimensioned to receive and grip either one or two wires over a substantial range of wire-diameter, the pin grip portions being disposed on a circle, and the wire grip portions being disposed on a concentric circle of larger diameter, the latter diameter being larger than the diameter of the base of the tube to be received by the socket.

References Cited in the file of this patent

UNITED STATES PATENTS

| | | |
|---|---|---|
| 1,774,646 | Goudy | Sept. 2, 1930 |
| 2,017,940 | Bessey | Oct. 22, 1935 |
| 2,066,876 | Carpenter | Jan. 6, 1937 |
| 2,128,132 | Frederick | Aug. 23, 1938 |
| 2,503,559 | Miloche | Apr. 11, 1950 |
| 2,519,121 | Del Camp | Aug. 15, 1950 |

FOREIGN PATENTS

| | | |
|---|---|---|
| 698,029 | Great Britain | Oct. 7, 1953 |